United States Patent Office 3,307,924
Patented Mar. 7, 1967

3,307,924
COPPER INFILTRATING COMPOSITION FOR POROUS FERRUGINOUS MATERIAL
Arthur B. Michael, Munster, Ind., assignor to The Glidden Company, Cleveland, Ohio, a corporation of Ohio
No Drawing. Filed June 30, 1965, Ser. No. 468,591
8 Claims. (Cl. 29—182.5)

This invention relates to a copper composition for infiltrating a porous mass of ferruginous material, to a method of making such infiltrating composition, and to a process of using same.

Heretofore, surface erosion of a ferruginous mass in contact with copper-infiltrating composition has been reduced or eliminated by incorporation of a small amount of iron in the infiltrating composition. Additionally, where the mass to be infiltrated contains carbon, a small amount of carbon in the infiltrating composition heretofore has been found to be a material assistance in reducing sticking of infiltrating composition residue to the part, Furthermore, sticking of such residue has been found to have been reduced by the incorporation of substantial proportions (usually above 1%) of impalpable refractory "parting compounds" such as magnesium oxide into the infiltrating composition.

However, such adherence of residue, necessitating costly removal and substantial discoloration or disfiguration of the resulting infiltrated part, is still a significant and often disturbing problem. To the extent that it can be alleviated by incorporating a fairly high proportion of parting compound into the infiltrating composition, such sometimes can be done, but, among other things, this undesirably reduces the infiltrating efficiency in a highly competitive manufacturing field.

I have now discovered an infiltrating composition for this service which, when compacted into a body and heated in conventional manner for infiltration of a ferruginous mass, leaves a residue which, surprisingly, shrinks and warps a great deal through coalescence in a way that reduces surface contact between the infiltrant and the ferruginous mass during and after the infiltration process. This shrinkage and warpage yields a husk-like residue having relatively little surface area in contact with the resulting infiltrated ferruginous mass. Because of this very much reduced area and because of the virtual freedom from adherency of the residue remaining from my infiltrating composition, the husk is quickly and simply removed from the infiltrated mass by brushing, blowing, or the like, and, because of its low concentration of parting compound, the composition can give desirably high infiltrating efficiencies at the same time. Infiltration with my composition can yield readily objects having an excellent modulus of rupture and freedom from unsightly and costly surface erosion and adherent residual infiltrant.

My infiltrating composition consists essentially of an intimate mixture of about 0.6 to 0.9 weight part of impalpable refractory, 0 to about 1 weight part of impalpable carbon, about 5 to 12 weight parts of particulate iron having particle size finer than 325 mesh, and the balance finely-divided copper. Some to all of the iron and copper present in the mixture can be preformed, before mixing with the refractory and carbon, as particulate sintered copper-iron agglomerate, which agglomerate particles have size not substantially in excess of about 50 mesh.

The infiltrant is prepared by mixing together the above-described ingredients in the above-described proportions, and then forming at least a portion of the mixture into a compacted body for use in infiltration.

Infiltration is carried out by contacting the mass of porous ferruginous material with a compacted body of the infiltrating composition, heating the contacted mass and body to a temperature sufficient for causing infiltrating of copper from the body into the mass, and removing the resulting husk-like residue of the body from the resulting infiltrated mass. The infiltrating composition and the ferruginous material ordinarily are enveloped in innocuous atmosphere during infiltration, e.g., a reducing atmosphere or at least a non-oxidizing one.

As used herein the term "infiltrating" is meant to be synonymous with "impregnating" and "investing," and such terms refer to the flowing of molten copper infiltrant into porous ferruginous material. The porous ferruginous mass, e.g., iron, steel, stainless steel, and the like is often the corresponding powder compressed into shapes such as gears, trips, rings, or like useful forms. Conveniently I thus often refer to the porous ferruginous material as the "iron compact." Such compacted ferruginous mass can be sintered prior to infiltration, although simultaneous sintering and infiltrating is usually preferred for economy.

For ease in handling, storage, and use the copper infiltrating composition, also referred to herein as the "infiltrant" or the "impregnant," is compressed into various shapes, e.g., briquettes, bars, blocks, rods, plates for stacking, etc. In selecting a particular shape for a particular iron compact, my copper infiltrating powder can be compressed, e.g., at pressures from about 8 to 50 tons per square inch, into a body having a configuration of at least one surface generally similar in configuration with the iron compact surface with which the infiltrant is to be in contact.

The contact can be essentially between broad surfaces or be essentially a line or points of infiltrant contacting a broader surface of the ferruginous mass. Placing such surfaces in contact, for at least initial infiltration, enhances uniformity of infiltration, as will be well recognized by those skilled in the art.

The finely-divided copper for the infiltration mixture should have particle size not substantially in excess of about 50 mesh to provide ready mixing with, and uniform distribution in, the infiltrant ingredients, e.g., good copper-iron uniformity in preparing a sintered agglomerate of same ("mesh" as used herein is U.S. Standard Sieve Series). To enhance such uniformity and mixing, I advantageously employ a copper powder having particle size such that virtually all particles pass 100 mesh, and for best uniformity I prefer to use such copper powder having between about 40–70 weight percent of particles finer than about 325 mesh. The amount of copper present in the infiltration mixture will be the balance, by weight, of material needed to prepare about 100 weight parts of refractory, carbon, iron, and copper, i.e., about 86–94 weight parts copper. To provide sufficient iron in the infiltrant for good husk development from the infiltrant residue, I prefer to use about 88–92 weight parts copper.

In making my infiltration composition, I must use particulate iron which is finer than 325 mesh, i.e., all particles pass through a 325 mesh U.S. Standard Sieve, to avoid adhesion of infiltrant residue to the infiltrated compact. Additionally such particulate iron promotes effective coalescence of the residual infiltrant in service, that is, provides good husk formation; and iron at least this critically small quickly and effectively satisfies the dissolving power of copper for iron during infiltration, so that even the initial copper entering the iron compact will not erode the infiltration surface of such compact. For retained freedom from husk adherence along with advantageous husk development, I use iron powder having particle size finer than about 400 mesh.

The infiltration composition should contain about 5 to 12 weight parts iron. An infiltrant composition of less than about 5 weight parts iron can produce, upon infiltration, a powdery, diffuse residue which can lead to undesirable adherence of residue particles to the iron compact. On the other hand, greater than about 12 weight parts iron is uneconomical because much such iron does not infiltrate. For best husk formation and for most economical operation, I prefer to use about 7 to 10 weight parts iron in the infiltrant.

When a sintered agglomerate is prepared and the agglomerate then mixed with other infiltrant ingredients some to all of the copper, or iron, or both can be preformed, or formed in situ during sintering, from a suitable metal-providing powder such as an oxide of the metal, oxide-yielding compound of the metal, or mixture thereof. Thus, suitable materials which can be used in place of copper metal include cupric carbonate including its malachite, azurite and chessylite forms, cupric hydroxide, cuprous oxide including paramelaconite and tenocite, and their mixtures. Likewise suitable iron-providing powders which can be used in place of iron metal include ferrous carbonate, hydrated ferrous carbonate, tetra carbonyl iron, nona carbonyl iron, ferrous hydroxide (including goethite), ferrous oxide, ferroferric oxide (including hematite as well as limonite and other hydrated ferric oxides, e.g., the $\alpha$, $\beta$ and $\gamma$ forms), and mixtures thereof.

For best stability against particle segregation in handling and storage I prefer to use an infiltrating mixture which has a preponderant amount of the copper and the iron contained therein, present in the form of a sintered iron-copper agglomerate. Preferably, for efficiency and economy in preparing the sintered agglomerate, I use a commercial cuprous oxide to supply the copper in the agglomerate, i.e., an oxide containing about 94 to 99 weight parts cuprous oxide, and a balance of copper, cupric oxide, or mixture thereof. Additionally, for economy and because it works especially well with my preferred cuprous oxide, I prefer to use metallic iron powder to supply the iron in the agglomerate.

It should be understood that the finely-divided copper and iron, including their copper-providing and iron-providing substances, can contain trace proportions of impurities, as for example, silicon, sulphur, phosphorous and the like, as well as trace to minor proportions, i.e., up to 5 weight percent, of metals such as tin, manganese, zinc and the like which can alloy with the iron and the copper, or both. Thus, for my preferred metallic iron powder I have used mill scale reduced in the presence of a small amount of $BaCO_3$ energizer, carbonyl iron, and reduced mixtures of carbon and mill scale, all of which often contain small proportions of such metals and impurities. Generally the metals contained in the infiltrant in greater than trace amounts are those which alloy with copper. The alloy can effect a reduction in the copper surface tension and thus enhance infiltration and/or increase the strength of the infiltrated copper matrix.

As will be well recognized by those skilled in the art, when an iron powder such as ferric oxide is used in agglomerate preparation, the amount necessary to provide a particular concentration of iron in the agglomerate will depend upon the theoretical hydrogen loss of the iron oxide and the extent to which such theoretical loss is approached in sintering. Theoretical hydrogen loss as used herein is derived by conventional stoichiometric calculations for complete reduction of such oxides or the like, and is expressed as a percentage, which percentage is derived by dividing the weight of the completely reduced substance into the weight of material lost in reduction.

Advantageously, to provide a balance between the metal available for infiltrating (copper with a little iron) and that available for husk formation (iron metal), I approach essentially complete reduction, i.e., at least about 98% reduction, and preferably, for economy and best balance, up to about 99.8%, and beyond, of the theoretical hydrogen loss. By "reduction" herein, I mean reduction of the iron-providing and copper-providing powders substantially to their elemental states as well as accompanying similar reduction of transitory intermediates en route, hence such reduction can be considered as a "coreduction." It will be recognized that, where subsequent infiltration is carried out in an inert atmosphere or reducing atmosphere, this virtually complete reduction will not be disturbed.

Although some sintering of the iron and copper particles can be effected at lower temperatures, particularly where the powders exhibit clean, fresh surfaces, to avoid prolonged sintering times in agglomerate preparation I employ a temperature above about 500° F. To prevent the formation of solid, coarse lumps, e.g., having particle size of about 10 mesh or larger, I maintain my sintering temperatures below the liquidus temperature of the powder mixture. For economy I advantageously sinter between about 800 to 1600° F. because operating below about 800° F. can require longer sintering times than desired, and employing a temperature above 1600° F. can lead to a dense, autogeneously bonded product which can be uneconomical to comminute to a particulate agglomerate having particle size not substantially in excess of about 50 mesh. For most efficient operation without undesirable densification I prefer to employ a temperature between about 1000 to 1400° F.

Within my preferred sintering temperatures of between about 1000 to 1400° F., maintaining such temperature for about 20 minutes can provide sufficient sintering to prepare the resulting agglomerate and further produce 98% and greater reduction of any iron-providing and copper-providing substances present in the powder mixture. On the other hand, maintaining such temperature for more than about 2 hours will produce only negligible, if any, change, e.g., further oxide reduction, in the sintered agglomerate, and is therefore uneconomical. Preferably, for efficiency and economy, I sinter within my preferred temperature range for a time between about 40 to 90 minutes.

To prevent oxidation of the powders in sintering, I use an inert atmosphere or a reducing atmosphere. Additionally, such an atmosphere aids in removing films of adsorbed gas from particle bonding surfaces, thus improving interparticle contact and assisting the autogenous particle bonding. Where at least some portion of the iron or copper powder, or both, is provided by an oxide or oxide-yielding powder, I prefer to use preponderantly all reducing gas for most efficient and economical reduction. Suitable reducing atmospheres I can and have used include cracked ammonia, hydrogen, mixtures of hydrogen and carbon monoxide, and gaseous mixtures such as reducing gas derived from hydrocarbons, blue water gas, carburetted water gas, oil gas, and producer gas, i.e., gases usually rich in hydrogen and carbon monoxide, and further containing hydrocarbons, e.g., methane, ethylene, and the like. Advantageously, for efficient reduction the reducing gas has a dew point below about 75° F., and preferably much lower for most effective reduction. Suitable inert gases include nitrogen and argon. Preferably, because of the economy afforded through ready availability, I use a reducing gas derived from hydrocarbons.

To provide uniform mixing of the agglomerate with the parting compound and any further impalpable materials such as carbon, the agglomerate should have particle size not substantially in excess of about 50 mesh, and, advantageously, for enhanced mixing, should have particle size not substantially in excess of about 100 mesh. After sinter the agglomerate can be classified and that portion having particle size substantially more coarse than about 50 mesh can be comminuted without destroying the iron-copper matrix formed on sintering. Alternatively, the entire agglomerate is passed through comminution apparatus without classifying. The comminution should not reduce the agglomerate to a fineness where more than about 50% of such particles will pass 250 mesh, since agglomerate particles more coarse than about 250 mesh enhance entrapment of the parting compound and other impalpable material. For best entrapment I prefer to have about 50 to 90 weight parts of agglomerate particles within a size range between about 80 to 200 mesh. For comminution of the agglomerate I generally use a disc mill.

My parting compound, otherwise referred to herein as the "refractory," is a material which is virtually incapable of oxidizing iron and copper at temperatures up to about 2350° F., as well as being a material virtually incapable of reduction by hydrogen at such temperature. Suitable compounds include oxides and mixed oxides of aluminum, barium, beryllium, calcium, cerium, hafnium, magnesium, strontium, thorium, titanium and zirconium, carbides of aluminum, beryllium, boron, titanium, silicon, and tungsten, and nitrides of boron and titanium as well as mixtures of these oxides, mixed oxides, carbides and nitrides. I specifically mean to include in the mixed oxides such natural refractory minerals as feldspar, aluminum silicates, micas, kaolins, talcs and various clays such as bentonite and china clay. Thus, although silicon oxides alone are not generally useful owing to their reactivity with the iron during infiltration, I can use oxides in combined form, e.g., aluminum silicates. Because it works well in my infiltrant and is readily obtainable in suitably fine form, I prefer to use titanium dioxide.

The refractory should be impalpable in use, i.e., have virtually all particles passing 250 mesh with not substantially more than about 10 weight percent of such particles being retained at 325 mesh. This ensures good mixing with the other infiltrant ingredients, and also, where a sintered agglomerate is used, endures good entrapment of these particles by the agglomerate particles. Additionally, the refractory assists in preventing erosion of the ferruginous material by the molten infiltrating metal and the impalpable character of the refractory can enhance this refractory benefit. Preferably, for best entrapment, all to substantially all refractory particles have diameter in at least one dimension of less than about one micron.

The infiltrating composition should contain between about 0.6 to 0.9 weight part of refractory. Using less than about 0.6 weight part can lead to some erosion of the iron compact at the impregnating surface, caused by molten infiltrating copper. Using greater than about 0.9 weight part of refractory can retard sintering of the iron in the infiltrant residue and thus can lead to poor husk development. Also, the residue can stick badly, as will be shown hereinafter. Preferably, for best husk development without compact erosion I use between about 0.7–0.8 weight part of refractory.

When the iron compact being infiltrated contains iron in the presence of carbon, the infiltrant should also contain carbon to satisfy the carbon-dissolving power of the iron in the infiltrant. This prevents alloying of the infiltrant iron with the carbon in the iron compact, which alloying can form an adherent infiltrant residue and further can erode the infiltrating surface of the compact. To prevent such alloying I use between about 0.15 to 1 weight part of carbon in the infiltrant. Using less than about 0.15 weight part can lead to some erosion of the iron compact, while using greater than about 1 weight part simply adds further carbon to the mixture without significant corresponding benefit and is therefore uneconomical. Where the iron compact contains trace amounts to essentially no carbon, for economy I prefer to prepare essentially carbon-free infiltrants for impregnating such compact, although the inclusion of some carbon, e.g., up to about 1 weight part in such infiltrant, is tolerable.

The carbon should be impalpable in nature and intimately mixed in the infiltrating composition to satisfy the dissolving power of the infiltrant iron for carbon during infiltration. The carbon can be simply blended with the other ingredients, e.g., the refractory copper, and iron, or refractory and sintered agglomerate, and/or provided as an alloy with the impregnant iron. When a sintered agglomerate is used, the carbon can be readily distributed during blending as entrapped particles in the agglomerate.

To enhance segregation resistance in mechanical mixtures, the carbon particles have particle size in the same general range as for the refractory, which size has been discussed hereinabove. For efficient preparation of the infiltrant, I prefer to prepare an infiltrant which has the carbon present as entrapped particles in the agglomerate. For such an infiltrant I generally use graphite, i.e., "natural" carbon, although other forms, e.g., lampblack, bone charcoal, carbon black, and the like are useful. The irregularly shaped particles of the natural carbon assist in the entrapment of the carbon, thus enhancing resistance to segregation after blending, and such natural carbon is therefore preferred.

The infiltrating composition can contain minor amounts, e.g., up to one weight part, of a lubricant which augments the ready mixing of the infiltrating composition into a uniform mass. During infiltration the lubricant volatilizes without interfering with infiltration. Suitable lubricants which I can and have used include alkyd resins, metal salts of fatty acids of glyceride oils such as zinc stearate and lithium stearate, polyethylene glycols, fatty acids of glyceride oils, e.g., stearic acid, and the like.

Infiltration is carried out at a temperature reaching or slightly surpassing the melting point of copper, and as used herein, such infiltrating temperature should be construed, for the above-mentioned copper-tin, etc. alloys, as infiltrating at a temperature above the liquidus curve for such alloys. For efficient impregnation I employ a temperature between about 2000 and about 2350° F. At temperatures less than about 2000° F. infiltration can proceed at a slow, uneconomical rate. At temperatures greater than about 2350° F. the dissolving power of copper for iron rapidly increases and thus presents the possibility of surface erosion of the iron compact by the molten infiltrating copper. For most efficient infiltration with freedom from iron compact erosion I prefer to infiltrate at a temperature between about 2050–2200° F.

Generally the infiltration is done in conventional manner. Advantageously, the ferruginous mass and superimposed infiltrant body are enveloped in an innocuous atmosphere such as an inert gas or reducing atmosphere, or atmosphere consisting of mixtures of same.

Suitable reducing atmospheres for infiltration are those which are also useful in the sintering of the copper-iron agglomerate and include hydrogen, cracked ammonia and the like. Inert gases for the infiltrating atmosphere are nitrogen, argon and the like. These gases prevent deleterious metallic oxidation and enhance removal of adsorbed gaseous films which otherwise impede autogenous bonding of metallic particles, e.g., husk development.

As infiltration proceeds, the residual husk forms gradually, as evidenced by the infiltrating residue shrinking and concurrently warping away from interfacial contact with the iron compact. Separation of interfacial contact generally occurs first in the infiltrating body at the perimeter of the body face in contact with the iron compact. As a result, even when infiltrating with impregnants having substantially broad planar contact with the iron compact, the remaining husk upon finishing has small, almost point contact with such compact, which contact is at the approximate center of the husk face adjacent the compact. For infiltrating shapes such as rings, such broad planar contact can be reduced upon completing infiltration to almost line contact, at about the center of the husk surface adjacent the iron compact.

The following examples show ways in which my invention has been practiced, but should not be construed as limiting the invention. Hereinbelow and in the examples all parts are parts by weight, all percentages are percentages by weight, and all temperatures are in degrees Fahrenheit, unless otherwise specifically shown.

In the examples the elemental copper used had, typically, density of 2.8 gms./cc., a copper content of 99.3%, and an $H_2$ loss of 0.4%, with a trace of the copper particles being retained on 100 mesh, and 50–70% of the particles passing 325 mesh. The cuprous oxide used had particle size less than 50 mesh, 0.08% acid insolubles, 14% hydrogen loss, and contained typically about 97% cuprous oxide and the balance cupric oxide and elemental copper.

The iron used in the infiltrant had typically 0.60% hydrogen loss, 0.05–0.005% carbon, and a density of 0.85 gm./cc. The iron used in the iron compacts to be infiltrated had 100% of the particles passing 80 mesh and were either essentially carbon-free, i.e., contained 0.005% carbon or were alloyed with 1% carbon to form carbon-containing iron compacts. The iron compacts were compressed into bars having a density of 5.80 gms./cc.

The titanium dioxide refractory used had 99.99% of the particles passing 325 mesh and 50% of the particles with diameter in at least one dimension of less than 0.3 micron. The carbon used to form carbon-containing infiltrants was a graphite having a maximum residue of 2% retained on 325 mesh. All infiltrant bars contained 0.5% of conventional zinc stearate or stearic acid lubricant and infiltrating bars were formed by compacting the infiltrating ingredients at a pressure of 12 tons per square inch.

Example 1

Three sets of infiltrating bars, each set differing from the others on a basis of iron fineness, were prepared from essentially carbon-free iron. The copper used was elemental copper in all cases. The first set, referred to hereinafter as having "80 mesh" iron used iron of the following screen analysis:

| Mesh: | Percent |
|---|---|
| On 80 | 1 |
| On 100 | 8 |
| On 150 | 24 |
| On 200 | 15 |
| On 250 | 9 |
| On 325 | 15 |
| Through 325 | 28 |

The second set of infiltrating bars contained iron having 100% of the particles finer than 325 mesh, and the third set had 100% of the particles finer than 400 mesh. In all sets 0.7% titanium dioxide and 0.5% of lubricant was used. The percentage of iron used for each bar is given in the table below (iron plus copper being 98.8% of the infiltrating bar). In all sets the powdered infiltrant mixtures were mixed for 30 minutes to thereby produce uniform blends.

In each set infiltrating bars were compacted from 10 parts of the respective powdered blend and the iron compact bars to be filtrated were compacted from 30 parts of essentially carbon-free powder. Each infiltrating bar was placed flat upon the corresponding iron compact bar. Each infiltrating assembly was fed through a 4-inch metal belt furnace having a belt speed of 1 inch per minute and a maintained temperature of 2075°. The reducing atmosphere in the furnace was a gas having typically, in volume percent, 20% carbon monoxide, 40–45% hydrogen, 35–40% nitrogen, and 0.4% methane, which mixture had a dew point of +39° F.

Adhesion results of the infiltrant residue are summarized in the following table.

TABLE

| | Mesh | Percent Iron in Infiltrant | Adhesion Characteristic of Residue |
|---|---|---|---|
| Set 1 | 80 | 5 | Adhered. |
| | 80 | 7 | Do. |
| | 80 | 8 | Do. |
| | 80 | 10 | Do. |
| Set 2 | 325 | 5 | No Adherence. |
| | 325 | 6 | Do. |
| | 325 | 8 | Do. |
| Set 3 | 400 | 5 | No Adherence. |
| | 400 | 6 | Do. |
| | 400 | 8 | Do. |

With the 80 mesh powder at 5% iron the adhesion was severe and although the adhesion moderated a bit as the percent of iron increased, at 10% it was still very undesirable.

Example 2

Ten parts of the infiltrant iron having 100% of the particles pass 325 mesh were blended for 30 minutes with 0.7 part of titanium dioxide, 0.15 part graphite, and the balance copper. An infiltrating bar was made from 10 parts of the resulting blend and used to impregnate, in the manner of Example 1, an iron compact bar such as described in Example 1, except that the bar used herein was a carbon-containing iron compact.

After infiltration the infiltrant residue was in the form of a husk which husk represented 10% of initial infiltrant bar weight. Efficiency of impregnation was thus 90%. The husk was easily removed and displayed no adherence to the infiltrated compact.

Example 3

To 107 parts of cuprous oxide there was added 8 parts of iron having 100% of the particles passing 325 mesh. These powders were mixed for 30 minutes to produce a uniform blend and the resulting blend was coreduced in a thin layer furnace having a 20 foot long hot zone. The bed depth was ½ inch, the belt speed 6 inches per minute, and the temperature at the center of the hot zone was 1200°.

A reducing atmosphere of cracked ammonia having a dew point of +75° passed through the furnace at a rate of 4000 cubic feet per hour. The resulting sintered agglomerate analyzed at 0.06% acid insolubles and 0.1% hydrogen loss and thus was essentially 8 parts metallic iron dispersed in 92 parts metallic copper. The resulting sintered agglomerate was pulverized in a disc mill until all agglomerate particles passed 80 mesh.

To 100 parts of the agglomerate there was added 0.7 part of titanium dioxide and 0.3 part of graphite. After blending the ingredients for 30 minutes, 10 parts were compacted into an infiltrating bar and the resulting bar was used to infiltrate an iron compact, compacted from carbon-containing iron. The method of infiltration was that of Example 1.

After infiltration the infiltrant residue was in the form of a husk which husk represented 7.6% of the initial infiltrating bar weight; efficiency of impregnation was thus 92.4%. The husk showed an about 80% reduction in interfacial contact between the infiltrant and the infiltrated compact. The husk was easily removed and displayed no adherence to the infiltrated compact; visual inspection of such compact showed no surface erosion at the infiltrating face. The modulus of rupture of the infiltrated compact was 129,700 p.s.i.

When the same sort of test was made using the same kind of compact and the same kind of infiltrating composition, except that it had only 0.2 part $TiO_2$, the infiltrant residue was so strongly adhering to the iron compact that an erosion study was not even attempted since some of the iron compact material was removed during the difficult removal of infiltrant residue. Additionally, the modulus of rupture of the infiltrated compact was only 120,960 p.s.i.

When the same sort of test was made using the same kind of compact and the same kind of infiltrating composition, except that it had 1.5 parts $TiO_2$, the infiltrant residue remaining had sufficient powdery residue to present undesirable adherency of the residue to the infiltrated compact. Furthermore, the modulus of rupture of the compact was only 116,400 p.s.i.

*Example 4*

To 100 parts of the agglomerate prepared in Example 3 there was added 0.7 part of titanium dioxide, but no carbon. After blending these ingredients for 30 minutes, 10 parts of the mix were compacted into an infiltrating bar sufficient in size to impregnate sufficiently the iron compact described below.

Thirty parts of the carbon-free iron powder were compacted to produce an iron compact bar for infiltration. The infiltrating bar was placed flat upon the iron compact bar and the infiltration proceeded as in Example 1.

After infiltration the remaining husk showed about an 80% reduction in interfacial contact between the infiltrant and the infiltrated compact. The husk was easily removed and displayed no adherence to the infiltrated compact; visual inspection of the compact showed no surface erosion at the infiltrating face.

I claim:

1. A copper composition for infiltrating porous ferruginous material, which composition consists essentially of an intimate mixture of about 0.6 to 0.9 weight part of impalpable refractory, 0 to about 1 weight part of impalpable carbon, about 5 to 12 weight parts of particulate iron having particle size finer than 325 mesh, and finely-divided copper, wherein said composition constitutes substantially 100 weight parts.

2. The composition of claim 1 wherein said refractory is present in the proportion of 0.7 to 0.8 weight part, said iron is present in the proportion of about 7 to 10 weight parts, and said copper has particle size not substantially in excess of about 100 mesh.

3. The composition of claim 1 for infiltrating carbon-containing ferruginous material wherein the carbon in said composition is present in a proportion at least sufficient to satisfy the carbon-dissolving power of the iron in said mixture at a predetermined infiltration temperature.

4. The composition of claim 1 wherein at least a portion of the copper and iron in said intimate mixture is in the form of a sintered copper-iron agglomerate, and said agglomerate has particle size not substantially in excess of about 50 mesh.

5. The composition of claim 4 wheerin said agglomerate is the gas reduction product of particulate cuprous oxide in the presence of particulate iron metal, and said agglomerate has particle size not substantially in excess of about 100 mesh.

6. The method of preparing copper impregnant for infiltrating porous ferruginous material, which method comprises mixing together about 0.6 to 0.9 weight part of impalpable refractory, 0 to 1 weight part of impalpable carbon, about 5 to 12 weight parts of particulate iron having particle size finer than 325 mesh, and sufficient finely-divided copper to constitute substantially 100 weight parts, and forming at least a portion of the resulting mixture into a compacted body.

7. The method of claim 6 wherein at least a portion of said iron and copper are sintered together prior to mixing with said refractory and carbon, and the resulting sintered product used for said mixing has particle size not substantially above about 50 mesh.

8. The method of claim 7 wherein said iron and copper for sintering are preformed in elemental state before said sintering.

References Cited by the Examiner

UNITED STATES PATENTS

| | | | |
|---|---|---|---|
| 2,239,134 | 4/1941 | Wellman | 29—182.5 |
| 2,818,634 | 1/1958 | Batchelor et al. | 29—182.5 |
| 2,886,882 | 5/1959 | Cox | 29—182.5 |

FOREIGN PATENTS 166,840   11/1962   Russia.

CARL D. QUARFORTH, *Primary Examiner.*

L. DEWAYNE RUTLEDGE, *Examiner.*

R. L. GRUDZIECKI, *Assistant Examiner.*